US008939892B2

(12) United States Patent
Miyamoto

(10) Patent No.: US 8,939,892 B2
(45) Date of Patent: Jan. 27, 2015

(54) ENDOSCOPIC IMAGE PROCESSING DEVICE, METHOD AND PROGRAM

(75) Inventor: Masaki Miyamoto, Minato-ku (JP)

(73) Assignee: FUJIFILM Corporation, Tokyo (JP)

( * ) Notice: Subject to any disclaimer, the term of this patent is extended or adjusted under 35 U.S.C. 154(b) by 492 days.

(21) Appl. No.: 13/221,405

(22) Filed: Aug. 30, 2011

(65) Prior Publication Data

US 2012/0053408 A1 Mar. 1, 2012

(30) Foreign Application Priority Data

Aug. 31, 2010 (JP) .................................. 2010-194939

(51) Int. Cl.
*A61B 1/04* (2006.01)
*A61B 1/00* (2006.01)
(Continued)

(52) U.S. Cl.
CPC ........... *G06T 7/0044* (2013.01); *G06T 2210/41* (2013.01); *G06T 2219/2012* (2013.01); *G06T 2207/20221* (2013.01); *G06T 19/20* (2013.01);
(Continued)

(58) Field of Classification Search
CPC .... A61B 1/0009; A61B 1/0005; A61B 1/042; A61B 2019/505; A61B 2019/5295; A61B 2019/5289; A61B 2019/5291; A61B 6/466; A61B 6/5247; G06T 19/20; G06T 2207/20221; G06T 2207/10068; G06T 2219/2012; G06T 2207/10124; G06T 2207/10072; G06T 2210/41; G06T 7/0044
USPC .................. 600/109, 114, 117, 118, 416, 417
See application file for complete search history.

(56) References Cited

U.S. PATENT DOCUMENTS 7,889,905 B2 * 2/2011 Higgins et al. ................ 382/130
2007/0276225 A1 11/2007 Kaufman et al.
(Continued)

FOREIGN PATENT DOCUMENTS

JP 11-104072 A 4/1999
JP 11-318884 A 11/1999
JP 2001-204738 A 7/2001
(Continued)

OTHER PUBLICATIONS

Sidney W. Wang and Arie E. Kaufman, Volume-Sampled 3D Modeling, Sep. 1994, IEEE Computer Graphics and Applications, 26-32.*

(Continued)

*Primary Examiner* — Anhtuan T. Nguyen
*Assistant Examiner* — Alexandra Newton
(74) *Attorney, Agent, or Firm* — Sughrue Mion, PLLC

(57) ABSTRACT

Endoscopic images and virtual endoscopic images are obtained. Then, an endoscopic image captured at a predetermined position of the anatomical structure is extracted from the obtained endoscopic images, and a comparative virtual endoscopic image virtually generated as if it is captured at a position corresponding to the predetermined position is extracted from the obtained virtual endoscopic images, and the extracted images are associated with each other. A three-dimensional position corresponding to each pixel forming the endoscopic image captured at the predetermined position is calculated based on a three-dimensional position of each pixel forming the comparative virtual endoscopic image. Then, volume data is generated from the endoscopic image captured at the predetermined position based on a pixel value of each pixel forming the endoscopic image and the three-dimensional position calculated for each pixel.

8 Claims, 6 Drawing Sheets

(51) Int. Cl.
*G06T 19/20* (2011.01)
*G06T 7/00* (2006.01)

(52) U.S. Cl.
CPC .............. *G06T 2207/10124* (2013.01); *G06T 2207/10068* (2013.01); *G06T 2207/10072* (2013.01)
USPC ........................... 600/109; 600/114; 600/117

(56) References Cited

U.S. PATENT DOCUMENTS

2008/0097150 A1* 4/2008 Hasegawa et al. ............ 600/109
2008/0294105 A1* 11/2008 Gono et al. ................... 604/109

FOREIGN PATENT DOCUMENTS

| JP | 2003-093336 A | 4/2003 |
|---|---|---|
| JP | 2005-334462 A | 12/2005 |
| JP | 2006-061274 A | 3/2006 |
| JP | 2006-065397 A | 3/2006 |
| JP | 2006-341078 A | 12/2006 |
| JP | 2009-254837 A | 11/2009 |
| JP | 2009-279251 A | 12/2009 |
| JP | 2010-075368 A | 4/2010 |

OTHER PUBLICATIONS

Extended European Search Report, Application No. 12197495.0-1906; Feb. 26, 2013.
European Search Report for EP Application S.N.: 11 17 9145; Dec. 8, 2011.
Mixed Reality Merging of Endoscopic Images and 3-D Surfaces; Damini Dey, et al.; S.L. Delp, A.M. DiGioia, and B. Jaramaz (Eds.): MICCAI 2000, LNCS 1935, pp. 796-803, 2000.
Robert J.T. Sadleir, et al., "Colon Centerline Calculation for CT Colonography using Optimised 3 D Topological Thinning", Proceedings of the 1st International Symposium on 3D Data Processing Visualization and Transmission, IEEE Computer Society, 2002, pp. 800-803.
Office Action, dated Nov. 26, 2013, issued by the Japanese Patent and Trademark Office in corresponding Japanese Patent Application No. 2010-194939.

* cited by examiner

ENDOSCOPIC IMAGE PROCESSING DEVICE, METHOD AND PROGRAM

BACKGROUND OF THE INVENTION

1. Field of the Invention

The present invention relates to a technique to process an endoscopic image during surgery or examination with an endoscope being inserted in an anatomical structure of a subject, and in particular to a technique to process an endoscopic image with using a virtual endoscopic image that represents an anatomical structure of a subject.

2. Description of the Related Art

In recent years, techniques to observe or treat an anatomical structure, such as the intestine or the bronchial tube, of a patient with using an endoscope are attracting attention.

However, while an endoscopic image provides an image that clearly represents colors and textures of the interior of an anatomical structure captured with an image pickup device, such as a CCD, the interior of the anatomical structure is shown in a two-dimensional image, and therefore it is difficult to understand which position in the anatomical structure the image shows, and it is impossible to obtain information of the depth direction to reach a desired part. To address this problem, techniques to support understanding of the position of the endoscope in an anatomical structure of a subject with using a virtual endoscopic image obtained with a virtual endoscopic technique have been proposed. The virtual endoscopic technique generates an image similar to an endoscopic image from volume data, which is acquired through tomographic imaging with a modality, such as a CT apparatus.

For example, Japanese Unexamined Patent Publication No. 2001-204738 (hereinafter, Patent Document 1) discloses a navigation system for surgery, which involves: detecting the positions of an endoscope and a treatment tool used during surgery with a position detection sensor; measuring the distance from a distal end of an inserted portion of the endoscope to an object at a surgery site; transmitting positional data of the endoscope, etc., relative to reference three-dimensional coordinates and a three-dimensional image or two-dimensional image, which is generated from living body image data prepared in advance, to an image combining circuit; and displaying a three-dimensional image combined with shape data of the endoscope, etc., based on the positional data of the endoscope, etc., and shape data of the endoscope, etc.

Japanese Unexamined Patent Publication No. 2009-254837 (hereinafter, Patent Document 2) discloses a technique for supporting surgery, which involves: providing a position sensor at a distal end of an endoscope; specifying a target position in a reference coordinate system on a virtual endoscopic image; moving and positioning the distal end of the endoscope into a position in an anatomical structure corresponding to a point set in the target position; measuring the position and orientation of a catheter distal end of the endoscope relative to a three-dimensional reference system with a position sensor to align the position of the endoscope with the reference coordinate system to display the catheter distal end and the target on the virtual endoscopic image, for example.

Further, Japanese Unexamined Patent Publication No. 2009-279251 (hereinafter, Patent Document 3) discloses a device which generates a virtual endoscopic image from a three-dimensional image of a subject, that has been acquired in advance, calculates an error between the virtual endoscopic image and a real image captured with an endoscope, shifts the position of a view point of a virtual endoscope and repeats the calculation of the error between the shifted virtual endoscopic image and the endoscopic image until the calculated error becomes equal to or smaller than an acceptable error, and when the calculated error has become equal to or smaller than the acceptable error, calculates the position and orientation of a distal end of the endoscope based on a line of sight parameter of the virtual endoscopic image.

Yet further, Japanese Unexamined Patent Publication No. 2005-334462 (hereinafter, Patent Document 4) discloses a stereoscopic endoscope system for minimizing a misaligned area between right and left images and dissociation of accommodation and convergence, which includes: a stereoscopic hard endoscope for transmitting two subject images of a subject having a parallax therebetween; a focus controller for finding a distance between the subject and the stereoscopic endoscope; a stereoscopic TV camera including a right eye image CCD and a left eye image CCD for imaging the two subject images transmitted from the stereoscopic endoscope and a focal point changing unit for changing the focal point of the subject images; and an imaged area controller for controlling a display area of the subject images in the horizontal direction.

However, while the methods disclosed in Patent Documents 1 to 3 provide understanding of the position of the endoscope in an anatomical structure, it is impossible to apply various known analysis methods and image display methods, such as volume rendering and a display method for displaying a stretched development view of a tubular structure, unlike volume data acquired through tomographic imaging with a CT apparatus, or the like.

Further, while the method disclosed in Patent Document 4 provides three-dimensional understanding of the interior of an anatomical structure, it does not convert the endoscopic images into volume data. Therefore, unlike volume data, it is impossible to use various image analysis methods and image display methods with the endoscopic images.

SUMMARY OF THE INVENTION

In view of the above-described circumstances, the present invention is directed to providing an endoscopic image processing device, an endoscopic image processing method and an endoscopic image processing program, which allow application of various image display methods or image analysis methods to an endoscopic image captured with an endoscope inserted into an anatomical structure of a subject.

An aspect of the endoscopic image processing device of the invention includes: endoscopic image obtaining means for obtaining a plurality of endoscopic images captured with an endoscope inserted into an anatomical structure of a subject; volume data obtaining means for obtaining volume data of the anatomical structure acquired through tomographic imaging; virtual endoscopic image generating means for generating a plurality of virtual endoscopic images of the anatomical structure from the obtained volume data; associating means for extracting an endoscopic image captured at a predetermined position of the anatomical structure from the obtained endoscopic images, extracting a comparative virtual endoscopic image virtually generated as if it is captured at a position corresponding to the predetermined position from the obtained virtual endoscopic images, and associating the extracted endoscopic image and the comparative virtual endoscopic image with each other; position calculating means for calculating a three-dimensional position corresponding to each pixel forming the endoscopic image captured at the predetermined position based on a three-dimensional position of each pixel forming the comparative virtual endoscopic image; and endoscopic volume data generating means for generating volume data from the endoscopic image captured at the predetermined position based on a pixel value of each pixel forming the endoscopic image captured at the predetermined position and the three-dimensional position calculate for the pixel.

An aspect of the endoscopic image processing method of the invention includes: obtaining a plurality of endoscopic images captured with an endoscope inserted into an anatomical structure of a subject; obtaining volume data of the anatomical structure acquired through tomographic imaging; generating a plurality of virtual endoscopic images of the anatomical structure from the obtained volume data; extracting an endoscopic image captured at a predetermined position of the anatomical structure from the obtained endoscopic images, extracting a comparative virtual endoscopic image virtually generated as if it is captured at a position corresponding to the predetermined position from the obtained virtual endoscopic images, and associating the extracted endoscopic image and the comparative virtual endoscopic image with each other; calculating a three-dimensional position corresponding to each pixel forming the endoscopic image captured at the predetermined position based on a three-dimensional position of each pixel forming the comparative virtual endoscopic image; and generating volume data from the endoscopic image captured at the predetermined position based on a pixel value of each pixel forming the endoscopic image captured at the predetermined position and the three-dimensional position calculate for the pixel.

An aspect of the endoscopic image processing program of the invention is a program for causing a computer to function as: endoscopic image obtaining means for obtaining a plurality of endoscopic images captured with an endoscope inserted into an anatomical structure of a subject; volume data obtaining means for obtaining volume data of the anatomical structure acquired through tomographic imaging; virtual endoscopic image generating means for generating a plurality of virtual endoscopic images of the anatomical structure from the obtained volume data; n endoscopic image captured at a predetermined position of the associating means for extracting an endoscopic image captured at a predetermined position of the anatomical structure from the obtained endoscopic images, extracting a comparative virtual endoscopic image virtually generated as if it is captured at a position corresponding to the predetermined position from the obtained virtual endoscopic images, and associating the extracted endoscopic image and the comparative virtual endoscopic image with each other; position calculating means for calculating a three-dimensional position corresponding to each pixel forming the endoscopic image captured at the predetermined position based on a three-dimensional position of each pixel forming the comparative virtual endoscopic image; and endoscopic volume data generating means for generating volume data from the endoscopic image captured at the predetermined position based on a pixel value of each pixel forming the endoscopic image captured at the predetermined position and the three-dimensional position calculate for the pixel.

In the invention, a typical example of the anatomical structure is a tubular viscera, such as the esophagus, the stomach, the duodenum, the large intestine or the bronchial tube if the subject is a human body. However, the anatomical structure may be any anatomical structure as long as an endoscope can be inserted therein. The predetermined position may be any position in the interior of the anatomical structure. For example, the anatomical structure may be an area that is distinguishable by the user from other areas in the anatomical structure, such as a bend of the intestine or an area where a significant polyp is found. The three-dimensional position may be represented by coordinates, a vector, or any known method for representing a position in a three-dimensional space.

To the associating means according to the invention, any of various known methods that can extract an endoscopic image captured at a predetermined position of the anatomical structure and a comparative virtual endoscopic image, which is virtually generated as if it is captured at a position corresponding to the predetermined position, may be applied. For example, an endoscopic image that is captured with the distal end of the endoscope being positioned at a predetermined position may be obtained, and the position in the anatomical structure of the distal end of the endoscope positioned at the predetermined position may be detected according to the method disclosed in Patent Document 1 or 2, to obtain a view point of a virtual endoscope corresponding to the position of the distal end, and the comparative virtual endoscopic image may be extracted based on the view point of the virtual endoscope corresponding to the position of the distal end. For example, the endoscopic image and the comparative virtual endoscopic image may be extracted based on a degree of similarity between the endoscopic image and the virtual endoscopic image, which is found by comparing the images, as disclosed in Patent Document 3. Alternatively, the user may cause an endoscopic image representing a specific area having an distinguishable feature, such as a branched portion, of the anatomical structure and a virtual endoscopic image representing the same area to be displayed via operation of an input device, such as a mouse, and an input signal indicating that these images show the corresponding predetermined position may be received via operation of the input device by the user to associate the endoscopic image and the virtual endoscopic image which are displayed when the input signal is received with each other. It should be noted that a predetermined position at which the endoscopic image is captured and a position of the view point of the virtual endoscopic image associated with the endoscopic image based on the degree of similarity are believed to correspond to the same position of the anatomical structure.

In the endoscopic image processing device of the invention, the associating operation by the associating means and the calculation of the three-dimensional position may be carried out for only one predetermined position, or may be carried out for a plurality of predetermined positions.

The endoscopic image processing device according to the invention may further include reconstructed endoscopic image generating means for generating a reconstructed endoscopic image reconstructed from the endoscopic volume data generated from the endoscopic image, and display control means for causing the generated reconstructed endoscopic image to be displayed on a display device.

In the endoscopic image processing device according to the invention, the position calculating means may calculate a plurality of three-dimensional positions to be associated with a certain pixel among the pixels forming the endoscopic image captured at the predetermined position. Further, the position calculating means may position the three-dimensional positions associated with the certain pixel in a spherical shape, in a planar or curved shape having a predetermined size, or in a three-dimensional shape, such as a polyhedron (such as cube, cuboid, or the like), a circular cone or a pyramid. It should be noted that, since the endoscopic volume data where the pixel value of a certain pixel is reflected in a plurality of positions is generated by associating the plurality of three-dimensional positions to the certain pixel, it is preferred that the plurality of three-dimensional positions associated with the certain pixel are in the vicinity of each other.

In the case where the endoscopic image processing device according to the invention includes the reconstructed endoscopic image generating means, the reconstructed endoscopic image generated by the reconstructed endoscopic image generating means may be a stretched development image or a stretched cross-sectional image of the anatomical structure. However, the reconstructed endoscopic image is not limited to the above examples, and may be any image that can be displayed or reconstructed from the endoscopic volume data.

In the invention, the endoscopic images obtained by the endoscopic image obtaining means may be spectral images.

The spectral images refer to images provided by a technique (Narrow Band Imaging-NB1) where a living mucosa of a digestive organ (such as the stomach) is imaged with using an electronic endoscope apparatus using a solid image pickup device to generate a normal image representing an image of the visible light region of the living mucosa by imaging mainly the visible wavelength region and to generate different types of narrow-bandwidth spectral images of the living mucosa by imaging through different types of narrow-band bandpass filters which transmit light only through narrow wavelength bands, and the normal image and the narrow-bandwidth spectral images are combined to generate a diagnostic image (see Japanese Unexamined Patent Publication No. 2006-341078). Alternatively, the spectral images may refer to images provided by a technique where a normal color image (which is also referred to as "normal image") is captured with an endoscope, which is provided with an RGB mosaic filter formed by different types of wide-band bandpass filters disposed on a solid image pickup device, through a usual imaging operation using a simultaneous plane imaging technique, and images similar to the above-described narrow-bandwidth spectral images that are obtained with using the narrow-band bandpass filters are obtained through arithmetic processing based on the normal image obtained by imaging a living mucosa, to generate a diagnostic image similar to the above-described diagnostic image (see Japanese Unexamined Patent Publication Nos. 2003-093336 and 2010-075368).

The stretched development image refers to an image that appears as if a hollow viscus is stretched along a straight line and the tubular body thereof is cut and spread to expose the inner wall thereof (see, for example, Japanese Unexamined Patent Publication No. 2006-065397). The stretched cross-sectional image refers to an image that appears as if a hollow viscus is stretched along a straight line and the tubular body thereof is cut along the longitudinal direction (see, for example, Japanese Unexamined Patent Publication No. H11-318884).

The endoscopic image processing device according to the invention may further include unassociated area extracting means for extracting, from the endoscopic volume data, an unassociated area formed by three-dimensional positions that are associated with none of the pixels forming the endoscopic image captured at the predetermined position.

In the invention, an area in the endoscopic volume data formed by three-dimensional positions that are associated with none of the pixels of the endoscopic image is referred to as the "unassociated area". For example, according to the invention, the endoscopic volume data, where the pixel values of certain pixels are reflected in three-dimensional positions, is generated by calculating the three-dimensional positions corresponding to the pixels forming the endoscopic image. Therefore, there may be cases where it is impossible to associate an unimaged area in the anatomical structure, such as an area which is not captured in the endoscopic image due to a bumpy shape, such as a polyp, or a curved shape in the anatomical structure, with the three-dimensional positions of the endoscopic volume data. Further, there are cases where some pixels on the endoscopic image are not associated with the three-dimensional positions, such as the case where the endoscopic image processing of the invention is applied to only a part of the endoscopic image. In such a case, the unassociated area formed by the three-dimensional positions which correspond to none of the pixels forming the endoscopic image is generated.

In the case where the endoscopic image processing device according to the invention includes the unassociated area extracting means, the device may further include medical image generating means for generating a medical image from the volume data, wherein the display control means may cause a marking indicating the unassociated area to be displayed on the medical image generated from the volume data.

The medical image may be any image that can be generated from the volume data, and typical examples thereof include images generated by volume rendering and surface rendering.

In the case where the endoscopic image processing device according to the invention includes the unassociated area extracting means, display control means may cause a marking indicating the unassociated area to be displayed on the reconstructed endoscopic image generated from the endoscopic volume data.

As the marking indicating the unassociated area, any of known markings having various shapes, such as a circle, a rectangle or a closed surface, may be used. Further, any of various known display methods may be applied to the marking, such as coloring the marking or making the marking blink.

According to the endoscopic image processing device, method and program of the invention, a three-dimensional position corresponding to each pixel forming an endoscopic image captured at a predetermined position is calculated based on a three-dimensional position of each pixel forming a comparative virtual endoscopic image, and volume data is generated from the endoscopic image captured at the predetermined position based on a pixel value of each pixel forming the endoscopic image captured at the predetermined position and the three-dimensional position calculated for each pixel. Therefore, volume data having information of texture and color, which cannot be obtained with a modality like a CT apparatus, can be generated. Further, image display reconstructed from the endoscopic volume data or image analysis using the endoscopic volume data which cannot be achieved with usual endoscopic images, which do not have information of the depth direction, can be achieved. That is, according to the endoscopic image processing device, method and program of the invention, use of endoscopic images with various imaging diagnosis or image analysis methods can be achieved by generating the endoscopic volume data which has both the advantage of the endoscopic image that the interior of the anatomical structure can be shown with more realistic textures and colors and the advantage of the volume data that various image analysis and image display methods are usable, thereby providing a support for more accurate imaging diagnosis.

Further, in the case where the endoscopic image processing device according to in the invention further includes the reconstructed endoscopic image generating means for generating a reconstructed endoscopic image reconstructed from the endoscopic volume data generated from the endoscopic image, and the display control means for causing the generated reconstructed endoscopic image to be displayed on a display device, observation of the reconstructed endoscopic image having realistic textures and colors, which cannot be obtained from volume data obtained through conventional tomographic imaging, can be achieved, thereby providing a support for more accurate imaging diagnosis.

Still Further, in the case where the position calculating means in the endoscopic image processing device according to the invention calculates a plurality of three-dimensional positions to be associated with a certain pixel among the pixels forming the endoscopic image captured at the predetermined position, for example, a plurality of three-dimensional positions may be calculated for each of pixels of the endoscopic image representing an area of the anatomical structure that is far from the imaging unit. In this case, each of the pixels is associated with positions in a certain spatial range, so that the value of each of the pixels forming the endoscopic image is reflected on the plurality of three-dimensional positions.

It should be noted that endoscopic images have a nature that an area near to the imaging unit, such as a CCD camera, of the endoscope appears larger, and an area far from the imaging unit appears smaller. Therefore, the number of pixels representing the area far from the imaging unit is smaller than the number of pixels representing the area near to the imaging unit. In the generated volume data, therefore, a position corresponding to the area far from the imaging unit in the endoscopic image has a smaller number of positions on the endoscopic image associated therewith than those associated with a position corresponding to the area near to the imaging unit in the endoscopic image. In that case, there may be only sparse positions in the volume data that correspond to the endoscopic image. Therefore, by calculating and associating a plurality of three-dimensional positions in a certain spatial range for and with each pixel in an area in the endoscopic volume data that is far from the imaging unit and has smaller number of positions on the endoscopic image associated therewith, appropriate interpolation of pixel values in the area of the endoscopic volume data that has sparse corresponding pixels on the endoscopic image can be achieved. This minimizes such a situation that there are sparse positions in the volume data associated with the endoscopic image, and the volume data with each pixel reflecting an appropriate pixel value can be generated.

In the case where the endoscopic image processing device according to the invention includes the reconstructed endoscopic image generating means, and the reconstructed endoscopic image generated by the reconstructed endoscopic image generating means is a stretched development image or a stretched cross-sectional image of the anatomical structure, image observation that cannot be achieved with conventional endoscopic images can be achieved, thereby providing a support for more accurate imaging diagnosis.

In the case where the endoscopic image processing device according to the invention further includes the unassociated area extracting means for extracting, from the endoscopic volume data, an unassociated area formed by three-dimensional positions that are associated with none of the pixels forming the endoscopic image captured at the predetermined position, it is facilitated to recognize an area in the endoscopic volume data, for which no pixel values are obtained from the endoscopic image.

In the case where the endoscopic image processing device according to the invention includes the unassociated area extracting means, and further includes the medical image generating means for generating a medical image from the volume data, wherein the display control means causes a marking indicating the unassociated area to be displayed on the medical image generated from the volume data, it is facilitated to recognize an area in the endoscopic volume data, for which no pixel values are obtained from the endoscopic image.

Also, in the case where the endoscopic image processing device according to the invention includes the unassociated area extracting means, wherein the display control means causes a marking indicating the unassociated area to be displayed on the reconstructed endoscopic image generated from the endoscopic volume data, it is facilitated to recognize an area in the endoscopic volume data, for which no pixel values are obtained from the endoscopic image.

DESCRIPTION OF THE PREFERRED EMBODIMENTS

Hereinafter, embodiments of an endoscopic image processing method, an endoscopic image processing program and an endoscopic image processing method of the present invention will be described in detail with reference to the drawings.

Figure 1:
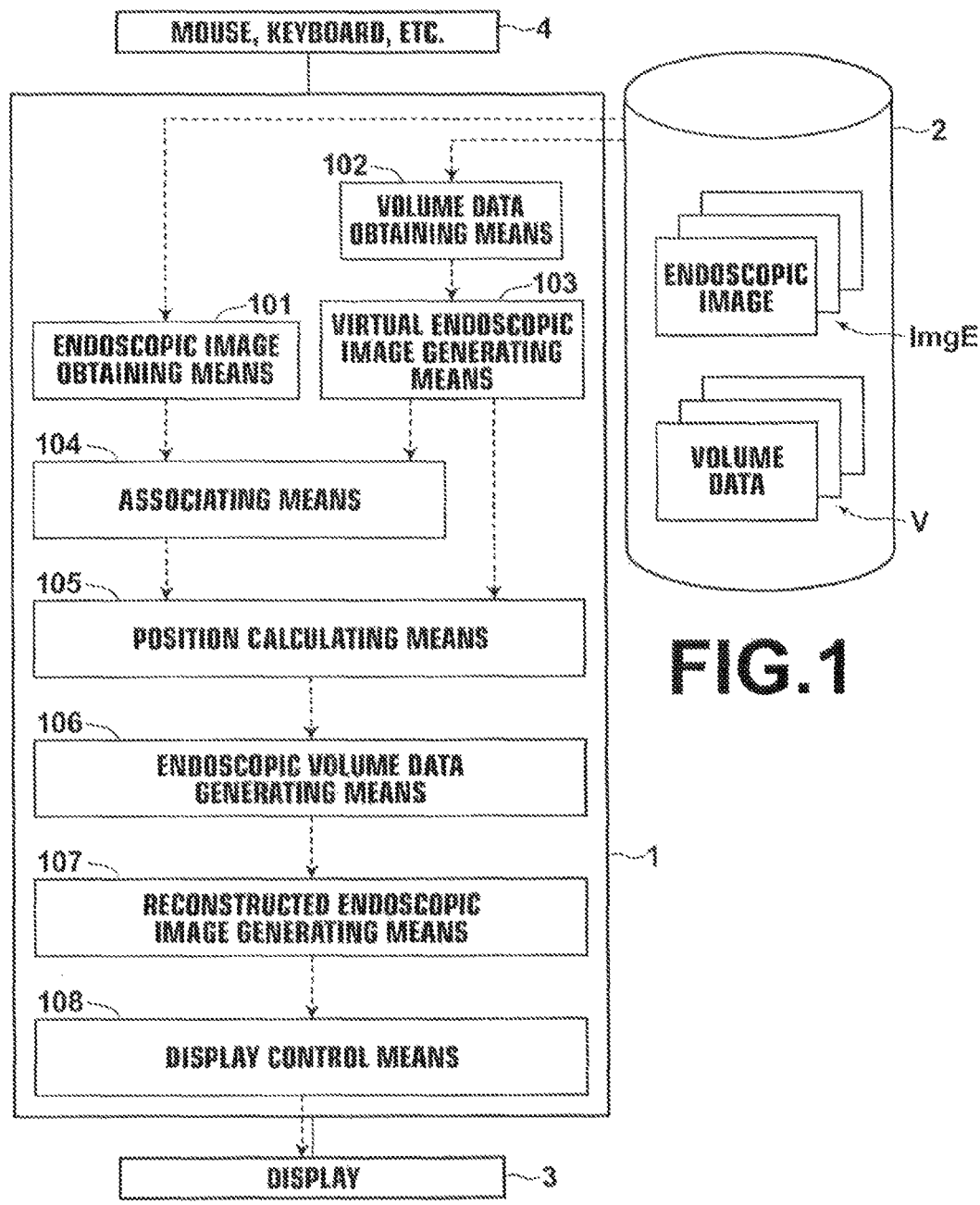
FIG. 1 is a functional block diagram of an endoscopic image processing device of a first embodiment.

FIG. 1 shows the schematic configuration of a diagnostic support device, which is implemented by installing a diagnostic support program on a workstation used by a doctor. The diagnostic support device 1 includes, as components of a standard workstation, a processor and a memory (which are not shown in the drawing), and further includes a storage 2, such as a HDD (Hard Disk Drive) or a SSD (Solid State Drive). Further, the endoscopic image processing device 1 has a display 3 and an input device 4, such as a mouse and/or a keyboard, connected thereto.

The diagnostic support program and data referenced by the diagnostic support program are stored in the storage 2 when the program is installed, and are loaded in the memory at the time of startup. The diagnostic support program prescribes, as operations to be carried out by the CPU: an endoscopic image obtaining operation; a virtual endoscopic image obtaining operation; an associating operation to extract an endoscopic image captured at a predetermined position in an anatomical structure and a comparative virtual endoscopic image which is virtually generated as if it is captured at a position corresponding to the predetermined position and associate the images with each other; a position calculating operation to calculate a corresponding three-dimensional position for each pixel forming the endoscopic image captured at the predetermined position; an endoscopic volume data generating operation to generate volume data from the endoscopic image captured at the predetermined position; a reconstructed endoscopic image generating operation to generate a reconstructed endoscopic image from endoscopic volume data $V_E$; and a display control operation.

Then, as the CPU carries out each of the above-described operations according to the prescription of the program, the general purpose workstation operates as: an endoscopic image obtaining means 101 for obtaining a plurality of endoscopic images captured by an endoscope inserted into an anatomical structure of a subject; a volume data obtaining means 102 for obtaining volume data of the anatomical structure acquired through tomographic imaging; a virtual endoscopic image generating means 103 for generating a plurality of virtual endoscopic images of the anatomical structure from the obtained volume data; an associating means 104 for extracting an endoscopic image captured at a predetermined position in the anatomical structure from the obtained endoscopic images, extracting a comparative virtual endoscopic image virtually generated as if it is captured at a position corresponding to the predetermined position from the obtained virtual endoscopic images and associating the extracted endoscopic image and the comparative virtual endoscopic image with each other; a position calculating means 105 for calculating a corresponding three-dimensional for each pixel forming the endoscopic image captured at the predetermined position based on a three-dimensional position of each pixel forming the comparative virtual endoscopic image; an endoscopic volume data generating means 106 for generating volume data from the endoscopic image captured at the predetermined position based on a pixel value of each pixel forming the endoscopic image captured at the predetermined position and the three-dimensional position calculated for each pixel; a reconstructed endoscopic image generating means 107 for generating a reconstructed endoscopic image $ImgR_E$ reconstructed from the endoscopic volume data $V_E$, which is generated from the endoscopic image; and a display control means 108 for causing the generated reconstructed endoscopic image $ImgR_E$ to be displayed on the display device 3.

The storage 2 stores volume data and a plurality of endoscopic images forming a moving image, which have been transferred from an examination department where imaging operations are carried out, or endoscopic images and volume data obtained by searching a database. The volume data may be directly outputted from a multislice CT apparatus, or the like, or may be generated by reconstructing a two-dimensional slice data group outputted from a conventional CT apparatus, or the like. Herein, each frame forming a moving image ImgE that is captured during a single endoscopic imaging operation is referred to as an endoscopic image ImgEi ($1 \leq i \leq m$, where m is the number of all the frames).

When the endoscopic image processing device 1 detects that a predetermined diagnostic support function is selected from a menu, the endoscopic image processing device 1 prompts the user to select or input information necessary to specify the volume data. Then, when the volume data is specified via the operation by the user, the corresponding volume data is loaded from the storage 2 to the memory.

Now, each functional block included in the endoscopic image processing device 1 shown in FIG. 1 is described in detail.

The endoscopic image obtaining means 101 has a function of communication interface for receiving, from the storage 2, the moving image ImgE formed by the endoscopic images ImgEi ($1 \leq i \leq m$) captured with an endoscope inserted into an anatomical structure of a subject, and storing the moving image ImgE in a predetermined memory area of the endoscopic image processing device 1.

The volume data obtaining means 102 has a function of communication interface for receiving, from the storage 2, volume data V of the anatomical structure, which is acquired through tomographic imaging carried out with a CT apparatus, and storing the volume data V in a predetermined memory area of the endoscopic image processing device 1.

The virtual endoscopic image generating means 103 generates a plurality of virtual endoscopic images ImgVg ($1 \leq g \leq h$, where each of g and h is a positive integer) of the anatomical structure from the obtained volume data with using a known method, and stores the virtual endoscopic images ImgVg in a predetermined memory area of the endoscopic image processing device 1.

The associating means 104 extracts an endoscopic image ImgEi (where i is a positive integer not more than m) captured at a predetermined position of the anatomical structure from the obtained endoscopic images and extracts a comparative virtual endoscopic image ImgVi virtually generated as if it is captured at a position corresponding to the predetermined position from the obtained virtual endoscopic images, and associates the extracted images with each other.

It should be noted that, in this embodiment, the associating means 104 extracts one frame per predetermined time interval from the frames forming the moving image that is acquired through endoscopic imaging, extracts a comparative virtual endoscopic image ImgVi ($1 \leq i \leq m1$) that is similar to each extracted frame, i.e., each endoscopic image ImgEi ($1 \leq i \leq m1$), according to the method disclosed in Patent Document 3, and associates the extracted images with each other.

The position calculating means 105 calculates a three-dimensional position of a corresponding pixel $P_j$ for each pixel $P_{pj}$ forming the endoscopic image ImgEi captured at each predetermined position based on a three-dimensional position of each pixel $Q_{pj}$ (where $1 \leq j \leq n$, n is the number of pixels forming the comparative virtual endoscopic image ImgVi) forming the comparative virtual endoscopic image ImgVi.

The endoscopic volume data generating means 106 generates endoscopic volume data $V_E$ from the endoscopic image(s) captured at the predetermined position(s) based on a pixel value of the each pixel $P_{pj}$ forming the endoscopic image(s) captured at the predetermined position(s) and the three-dimensional position calculated for each pixel.

The reconstructed endoscopic image generating means 107 generates a reconstructed endoscopic image reconstructed from the endoscopic volume data $V_E$, which is generated from the endoscopic image(s). The reconstructed endoscopic image may be any image that can be reconstructed from the volume data. For example, the reconstructed endoscopic image may be a volume rendered image generated by volume rendering, a surface rendering image, a stretched development image, a stretched cross-sectional image, a tomographic image of any plane, or an image generated through any of various known display methods or analysis methods.

The display control means 108 causes the generated reconstructed endoscopic image to be displayed on the display 3.

It is assumed here that an imaging operation with a multislice CT apparatus has been carried out during examination of a certain patient, and volume data containing information of the large intestine has been obtained.

First, a moving image ImgE, which has been captured by taking a moving image of the large intestine in the anatomical structure of the subject with the endoscope 1, has been obtained and stored in a database (not shown) via a network.

Further, volume data V containing information of the large intestine has been formed through imaging of the abdomen of the same subject with a CT apparatus and has also been stored in the database (not shown). When the user selects an endoscopic image processing function of the large intestine, which is the anatomical structure, and inputs the identifier of the patient and the examination date, the corresponding volume data V and the endoscopic images ImgEi (1≤i≤m) forming the corresponding endoscopic image (moving image) ImgE are obtained and stored in the storage 2. Then, endoscopic image processing of the invention is carried out.

Figure 2:
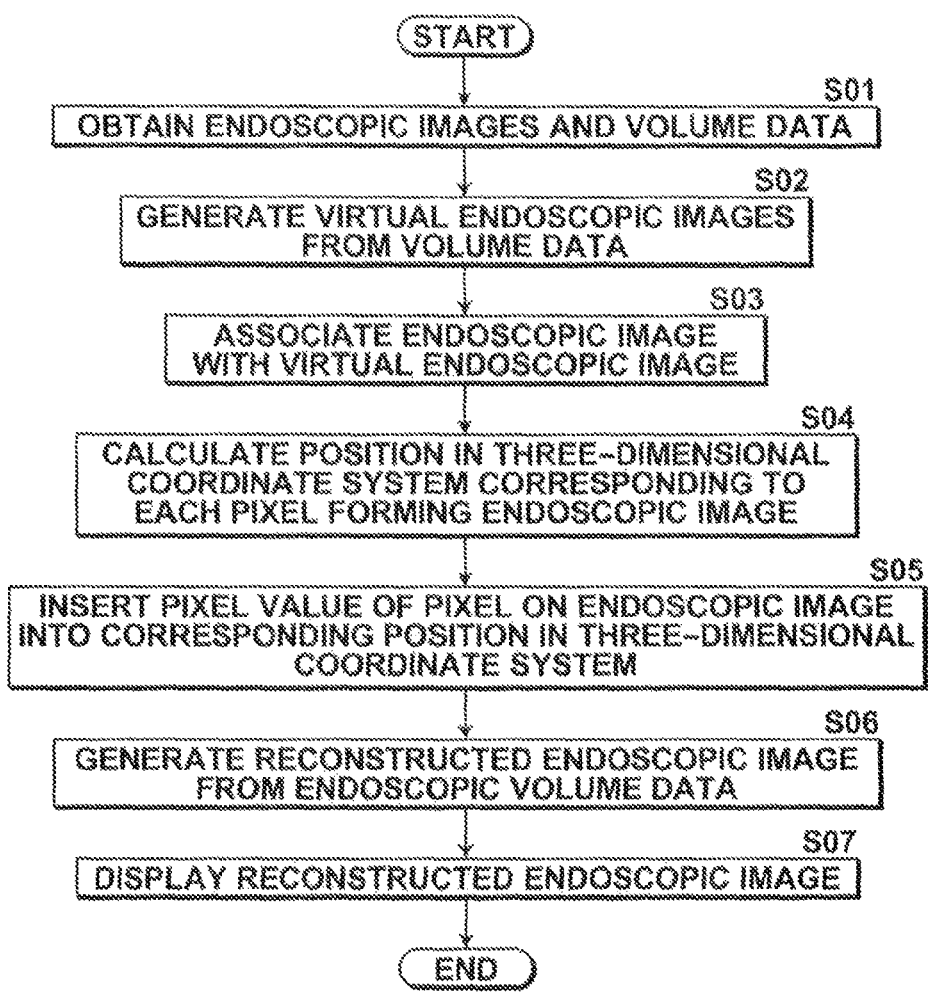
FIG. 2 is a flow chart showing the flow of endoscopic image processing of the first embodiment.
Figure 3:
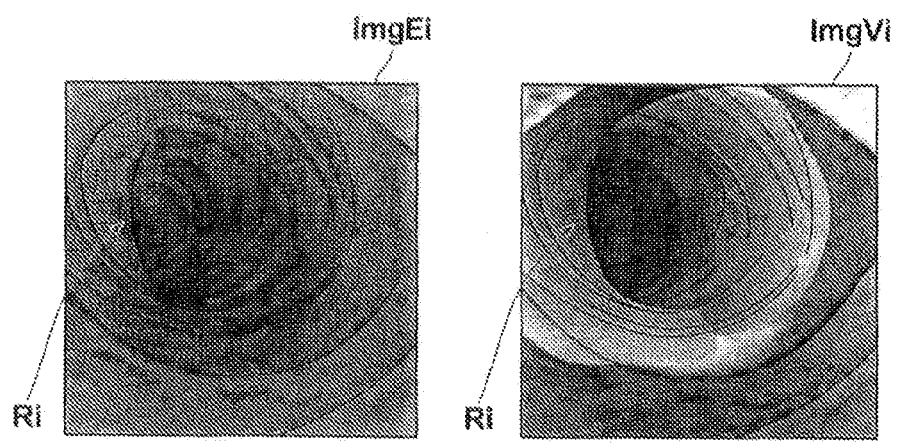
FIG. 3 is a diagram for explaining an example where an endoscopic image is associated with a comparative virtual endoscopic image in the first embodiment.
Figure 4:
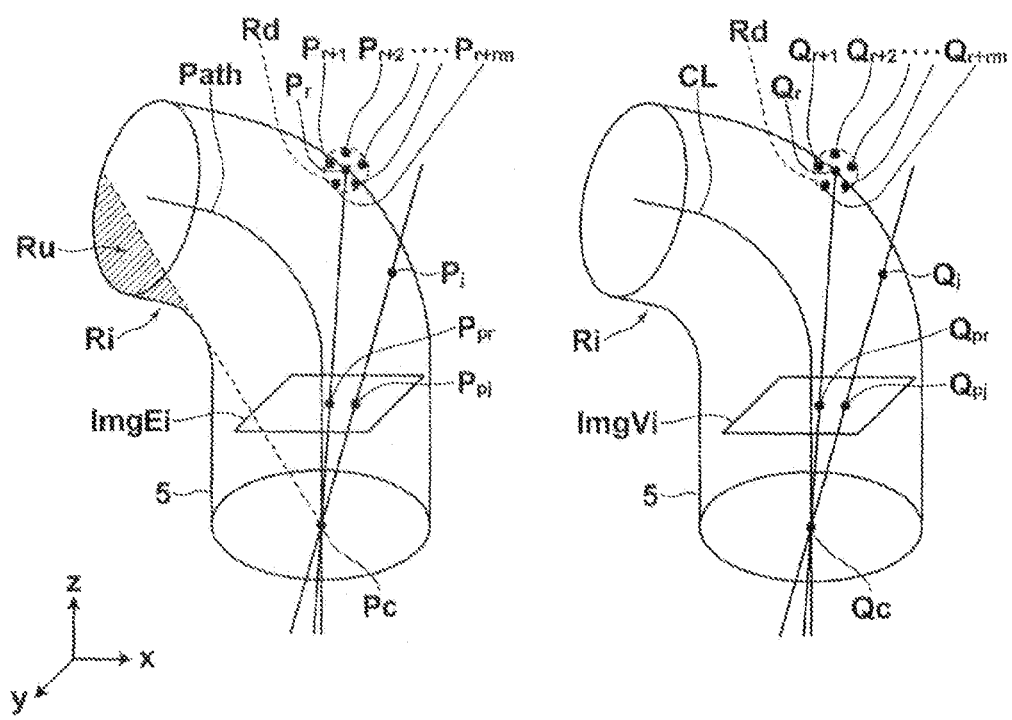
FIG. 4 is a diagram for explaining how a corresponding three-dimensional position of each pixel on an endoscopic image is calculated in the first embodiment.
Figure 8:
FIG. 8 is a diagram illustrating an example of a stretched development image generated in the first embodiment.

FIG. 2 is a flow chart illustrating a preferred embodiment of the endoscopic image processing method of the invention. FIG. 3 is a diagram for explaining how the endoscopic image is associated with the virtual endoscopic image. FIG. 4 is a diagram for explaining how a three-dimensional position of each pixel forming the endoscopic image is calculated with using the endoscopic image and the virtual endoscopic image associated with each other shown in FIG. 3. FIG. 8 shows an example of a stretched development image displayed according to this embodiment. Now, the endoscopic image processing method of this embodiment is described with reference to FIGS. 2, 3, 4 and 8.

First, the endoscopic image obtaining means 101 obtains the endoscopic images ImgEi (1≤i≤m) forming the moving image ImgE, which have been captured with the endoscope inserted into the anatomical structure of the subject, from the storage 2, and the volume data obtaining means 102 obtains the volume data V, which has been acquired through tomographic imaging with the CT apparatus, from the storage 2 (S01).

Then, the virtual endoscopic image generating means 103 generates the virtual endoscopic images ImgVg (1≤g≤h) of the anatomical structure from the obtained volume data (S02). The virtual endoscopic image generating means 103 detects the large intestine area, which is the anatomical structure, sets a large intestine center line CL, and generates the virtual endoscopic images ImgVg (1≤g≤h) with different points of view of the virtual endoscope along the large intestine center line CL by shifting the view point of the virtual endoscope along the large intestine center line CL. It should be noted that the extraction of the large intestine area and the extraction of the large intestine center line in this embodiment are achieved according to the method disclosed in "Colon centerline calculation for CT colonography using optimized 3D topological thinning", Proceedings of the 1st International Symposium on 3D Data Processing Visualization and Transmission, IEEE Computer Society, pp. 800-803, 2002. In this embodiment, the virtual endoscopic images of a sufficient number h (h≥m1) for extracting the comparative virtual endoscopic image are reconstructed.

Then, the associating means 104 carries out sampling from the obtained endoscopic images ImgEi (1≤i≤m) at predetermined time intervals, extracts an endoscopic image ImgEi captured at a predetermined position of the anatomical structure from the sampled endoscopic images ImgEi (1≤i≤m1), extracts a comparative virtual endoscopic image ImgVi virtually generated as if it is captured at a position corresponding to the predetermined position from the obtained virtual endoscopic images ImgVg (1≤g≤h), and associates the extracted images with each other (S03).

As shown in FIG. 3, in the endoscopic image ImgEi and the comparative virtual endoscopic image ImgVi associated with each other, a bend $R_i$ of the anatomical structure is shown with the almost same size at the same position on the images shown. Since the virtual endoscope generating means 103 generates the virtual endoscopic images ImgVi from the volume data V, that has been captured with the CT apparatus, based on imaging parameters, such as position, orientation, angle of view, etc., of a solid image pickup device of the endoscope, which are given in advance depending on the endoscopic imaging system that carried out the endoscopic imaging, the endoscopic image ImgEi and the comparative virtual endoscopic image ImgVi show the same area in the large intestine captured under the same conditions, such as the focal length and the angle of view, with a distal end Pc of the endoscope and a view point $Q_c$ of the virtual endoscope being in the same position of the anatomical structure and in the same orientation.

Subsequently, the position calculating means 105 calculates a corresponding three-dimensional position for each pixel $P_{pj}$ forming the endoscopic image ImgEi captured at each predetermined position based on a three-dimensional position of each pixel $Q_{pj}$ forming the comparative virtual endoscopic image ImgVi (S04).

Now, the operation carried out by the position calculating means 105 of this embodiment is described in detail with reference to FIG. 4 with taking the large intestine as an example. FIG. 4 shows, on the left, a positional relationship between an imaging unit Pc (the distal end of the endoscope) of the endoscope inserted into the large intestine 5 and the endoscopic image ImgEi. FIG. 4 further shows, on the right, a positional relationship between a view point $Q_c$ of the virtual endoscope inserted into the large intestine 5, which is extracted from the volume data acquired through CT imaging, and the virtual endoscopic image ImgVi. As shown on the left in FIG. 4, the endoscopic image ImgEi positioned in the X-Y plane is captured with the imaging unit of the endoscope positioned at the distal end Pc of the endoscope along a path Path of the endoscope. As shown on the right in FIG. 4, the virtual endoscopic image ImgVi projected on the X-Y plane is generated based on the view point $Q_c$ of the virtual endoscope along the large intestine center line CL.

First, the position calculating means 105 adjusts the size and resolution of the endoscopic image ImgEi and the comparative virtual endoscopic image ImgVi, as necessary, so that they have the same size and the same resolution, and normalizes the images so that a position $P_{pj}$ ($x_j$, $y_j$, 0) (1≤j≤n) of each pixel of the endoscopic image ImgEi and a position $Q_{pj}$ ($x_j$, $y_j$, 0) of each pixel forming the comparative virtual endoscopic image ImgVi correspond to each other on a one-to-one basis in the X-Y plane.

Thereafter, the position calculating means 105 calculates a position in the three-dimensional coordinate system of the volume data corresponding to each pixel of the virtual endoscopic image ImgVi. The method used for this calculation is described below.

A pixel value projected on the position $Q_{pj}$ ($x_j$, $y_j$, 0) (1≤j≤n, where n is the number of pixels of the virtual endoscopic image ImgVi) on the virtual endoscopic image ImgVi is a pixel value along a vector $v_j$ extending from the view point $Q_c$, shown below, where f is a focal length:

$$v_j = \frac{(x_j, y_y, f)}{\sqrt{x_j^2 + y_j^2 + f^2}}.$$

In the operation to generate the virtual endoscopic images, the virtual endoscopic image generating means 103 projects the pixel value of a pixel $Q_j$ ($x_j'$, $y_j'$, $z_j'$) on the inner wall of the anatomical structure among pixels along the vector $v_j$ extending from the view point $Q_c$. For example, in the case where the virtual endoscope is generated by volume rendering, the pixel value at a position $Q_j$ on the inner wall of the anatomical structure is projected on the position $Q_{pj}$ ($x_j$, $y_j$, 0) by setting the opacity of the inner wall of the anatomical structure to 1.0.

Along with this operation, the virtual endoscopic image generating means 103 extracts the position $Q_j$ ($x_j'$, $y_j'$, $z_j'$) on the inner wall of the anatomical structure projected on each position $Q_{pj}$ ($x_j$, $y_j$, 0) for each pixel of the virtual endoscopic image ImgVi. Then, a distance $t_j$ between the view point $Q_c$ and each position $Q_j$ ($x_j'$, $y_j'$, $z_j'$) is calculated according to Equation (2) below (where $1 \leq j \leq n$):

$$t_j = \sqrt{x_j'^2 + y_j'^2 + (z_j' + f)^2} \ldots,$$

and the calculated distance $t_j$ is stored with being associated with the position $Q_{pj}$ ($x_j$, $y_j$, 0).

Assuming that the position and the orientation of the view point $Q_c$ relative to the coordinate system of the volume data V are a position vector $q_c$ and an orientation (matrix) $R_c$, respectively, a vector extending from a view point Q1 to the position $Q_{pj}$ ($x_j$, $y_j$, 0) on the virtual endoscopic image ImgVi is $v_j$, and a distance from the view point $Q_c$ to the position $Q_j$ in the three-dimensional coordinate system is $t_j$, then, the position $Q_j$ in the three-dimensional coordinate system projected on the point $Q_{pj}$ ($x_j$, $y_j$, 0) of the virtual endoscopic image ImgVi is specified by Expression (3) below:

$$R_c t_j v_j + q_c \ldots.$$

The position calculating means 105 obtains, for each pixel $Q_{pj}$ forming the comparative virtual endoscopic image ImgVi, the position $Q_j$ in the coordinate system of the volume data associated therewith from the memory. Then, the position $Q_j$ ($x_j'$, $y_j'$, $z_j'$) of the pixel corresponding to the position $Q_{pj}$ of each pixel forming the comparative virtual endoscopic image ImgVi is calculated as a three-dimensional position $P_j$ ($x_j'$, $y_j'$, $z_j'$) corresponding to the position $P_{pj}$ ($x_j$, $y_j$, 0) on the endoscopic image, which corresponds to the same position on the X-Y plane as the $Q_{pj}$ ($x_j$, $y_j$, 0).

The position calculating means 105 calculates, for the position $P_{pj}$ ($1 \leq j \leq n$) of each pixel on the endoscopic image ImgEi, the corresponding three-dimensional position $P_j$ in the same manner. Then, the position calculating means 105 associates each position $P_{pj}$ on the endoscopic image with the corresponding three-dimensional position $P_j$ and stores them in the memory.

Subsequently, the endoscopic volume data generating means 106 generates the endoscopic volume data $V_E$ from the endoscopic image(s) captured at the predetermined position(s) based on pixel values of the pixels $P_{pj}$ ($x_j$, $y_j$, 0) forming the endoscopic image(s) ImgEi captured at the predetermined position(s) and the three-dimensional positions calculated for the pixels. In this embodiment, the endoscopic volume data generating means 106 inserts, for each pixel of the endoscopic image ImgEi shown on the left in FIG. 4, the pixel value at each pixel position $P_{pj}$ ($x_j$, $y_j$, 0) as the pixel value of the corresponding position $P_j$ in the three-dimensional coordinate system calculated for the pixel position (S05).

It should be noted that, in this embodiment, the operations in S03 to S05 are carried out for m1 endoscopic images ImgEi ($1 \leq i \leq m1$). In this case, the same area of the anatomical structure is captured in continuous frames, such as an endoscopic image ImgE$_k$ (where k is a natural number smaller than m) and an endoscopic image ImgE$_{k+1}$. Therefore, two or more positions, such as a position $P_{pf1}$ on the endoscopic image ImgE$_k$ and a position $P_{pf2}$ on the endoscopic image ImgE$_{k+1}$, are associated with a single position $P_f$($x_f$, $y_f$, $z_f$) in the three-dimensional coordinate system.

Now, the operation carried out by the endoscopic volume data generating means 106 in the case where two or more positions on two or more endoscopic images captured from different imaging positions are associated with a single position in the three-dimensional coordinate system is described. It is assumed here that the position $P_{pf1}$ on the endoscopic image ImgE$_k$ and the position $P_{pf2}$ on the ImgE$_{k+1}$ are associated with the position $P_f$ in the three-dimensional coordinate system. Based on a distance between the position $P_f$ in the three-dimensional coordinate system and each of the positions $P_{pf1}$ and $P_{pf2}$, the endoscopic volume data generating means 106 corrects the color and luminance of the pixel value of each of the positions $P_{f1}$ and $P_{f2}$ depending on the distance. Then, the endoscopic volume data generating means 106 inserts an average pixel value between the pixel values at the positions $P_{f1}$ and $P_{f2}$ as the pixel value at the position $P_f$ in the three-dimensional coordinate system.

The endoscopic volume data generating means 106 carries out the above-described operation of processing and averaging the pixel values of the pixels on the endoscopic images associated with the position $P_f$ in the three-dimensional coordinate system and inserting the average pixel value as the pixel value of the position $P_f$ in the three-dimensional coordinate system for each position $P_f$ in the three-dimensional coordinate system ($1 \leq f \leq l$) calculated by the position calculating means 106, thereby generating the endoscopic volume data $V_E$. It should be noted that "l" is the number of pixels in the three-dimensional coordinate system calculated by the position calculating means 105 corresponding to the pixels $P_{pj}$ forming the endoscopic images ImgEi.

Then, the reconstructed endoscopic image generating means 107 generates the reconstructed endoscopic image ImgR$_E$ reconstructed from the endoscopic volume data $V_E$, which is generated from the endoscopic images (S06). In this example, a stretched development display image, as shown in FIG. 8, is generated as the reconstructed endoscopic image ImgR$_E$ with using a known method.

Figure 5:
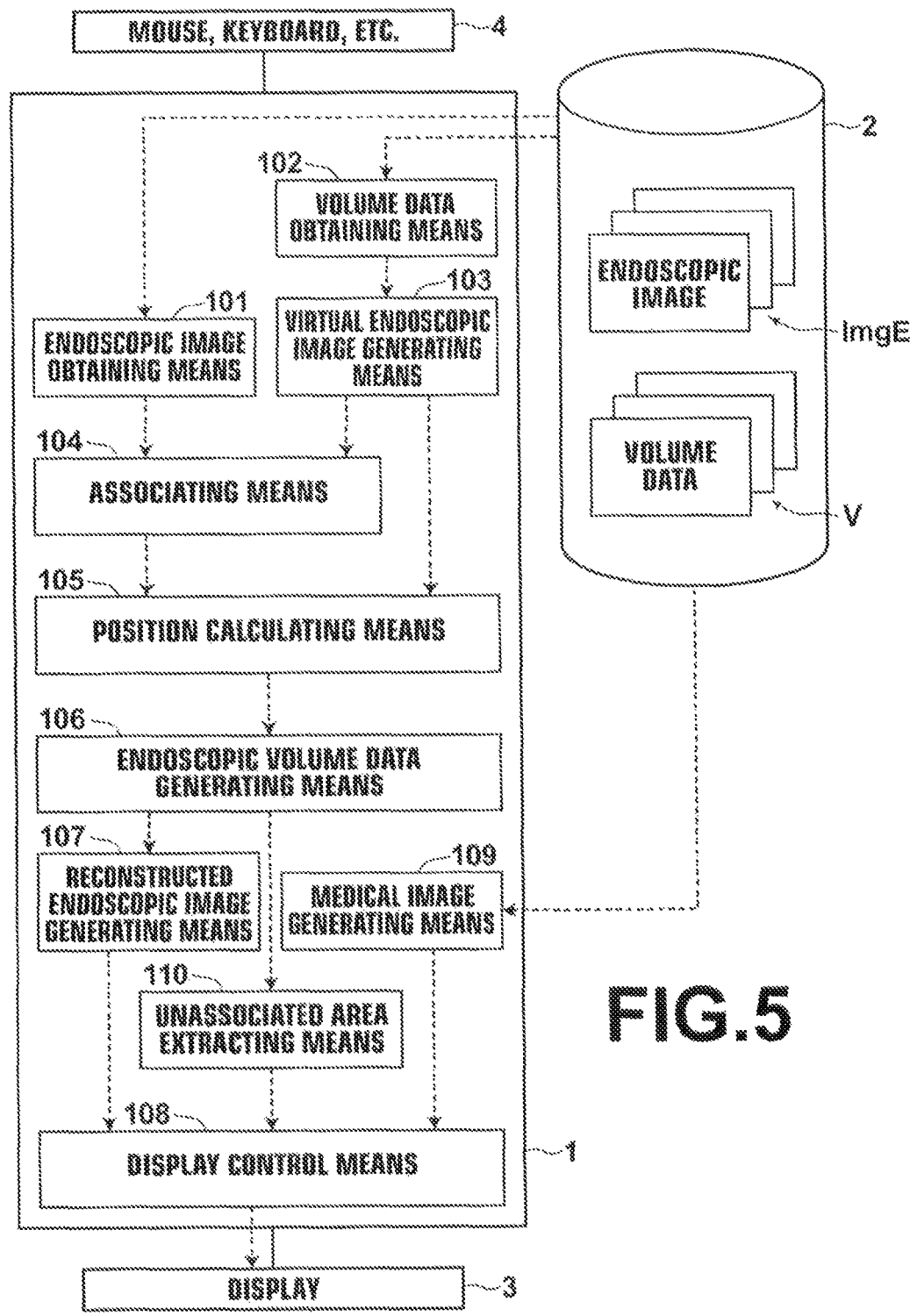
FIG. 5 is a functional block diagram of an endoscopic image processing device of a second embodiment.

The display control means 108 displays the generated reconstructed endoscopic image ImgR$_E$ on the display 3, as shown in FIG. 5, and the endoscopic image processing of this embodiment ends (S07).

As described above, according to this embodiment, the volume data $V_E$ is generated from the endoscopic images ImgEi. Therefore, volume data having information of texture and color, which cannot be obtained with a modality like a CT apparatus, can be generated. Further, image display reconstructed from the endoscopic volume data $V_E$ or image analysis using the endoscopic volume data $V_E$ which cannot be achieved with usual endoscopic images, which do not have information of the depth direction, can be achieved. That is, use of endoscopic images with various imaging diagnosis or image analysis methods can be achieved by generating the endoscopic volume data $V_E$ which has both the advantage of the endoscopic image that the interior of the anatomical structure can be shown with more realistic textures and colors and the advantage of the volume data that various image analysis and image display methods are usable, thereby providing a support for more accurate imaging diagnosis.

Further, according to this embodiment, the reconstructed endoscopic image generating means 107 for generating the reconstructed endoscopic image ImgR$_E$ reconstructed from the endoscopic volume data $V_E$, which is generated from the endoscopic images, and the display control means 108 for causing the generated reconstructed endoscopic image ImgR$_E$ to be displayed on the display device are provided. This allows observation of the reconstructed endoscopic image ImgR$_E$ having realistic textures and colors, which cannot be obtained from volume data obtained through conventional tomographic imaging, thereby providing a support for more accurate imaging diagnosis.

Still further, the reconstructed endoscopic image $ImgR_E$ generated by the reconstructed endoscopic image generating means 107 is a stretched development image of the anatomical structure. This allows image observation which cannot be provided with conventional tomographic imaging, thereby providing a support for more accurate imaging diagnosis.

Yet further, by applying the processing of this embodiment to the plurality of endoscopic images obtained at the plurality of predetermined positions of the anatomical structure, pixel values in a wider range of the anatomical structure can be obtained from the endoscopic images captured from the plurality of imaging positions to generate the endoscopic volume data $V_E$ covering a wider range of the anatomical structure. In addition, this minimizes such a situation that there are areas of the anatomical structure that are not captured in an endoscopic image due to bumps and curvature of the anatomical structure, and pixel values to be inserted in the endoscopic volume data $V_E$ cannot be obtained from such areas. It should be noted that, although the endoscopic volume data $V_E$ may be generated only from a single endoscopic image or a predetermined area of an endoscopic image, in that case, the range of the endoscopic volume data $V_E$ that can be generated is limited by the angle of view and the angle of the endoscope. Therefore, it is preferred to generate the endoscopic volume data $V_E$ from a plurality of endoscopic images captured at different predetermined positions, as in this embodiment. The different predetermined positions may be apart from each other by appropriate intervals such that computation load during the associating operation and the position calculating operation is not increased and such a situation that an area desired to be observed of the anatomical structure is not captured does not occur.

Further, according to this embodiment, the pixel value of each position Pz in the three-dimensional coordinate system is determined based on the pixel values of the pixels of the plurality of endoscopic images captured from the different imaging positions that are associated with the same position Pz in the three-dimensional coordinate system. Therefore, the thus generated endoscopic volume data $V_E$ has more accurate pixel values. Furthermore, errors of color, lightness, etc., which occur depending on the distance between the imaging unit and/or a light source of the endoscope and the anatomical structure, can be reduced by correcting the pixel values of the pixels of the plurality of endoscopic images representing the same position of the anatomical structure depending on the calculated distance between the imaging unit of the endoscope (the position at which the solid image pickup device is attached) and the position. It should be noted that, as the method for determining the pixel value to be inserted into the endoscopic volume data $V_E$ based on the pixel values of the pixels on the plurality of endoscopic images representing the same position, the pixel value of one of the endoscopic images where the calculated distance between the imaging unit of the endoscope and each position Pz of the anatomical structure is within a range of acceptable error from a distance set in advance may be selected, or any of known methods may be applied, as appropriate, instead of assigning an average value of the pixels associated with each position Pz in the single three-dimensional coordinate system.

As a modification of this embodiment, the position calculating means 105 may calculate a plurality of three-dimensional positions to be associated with a certain pixel among the pixels forming the endoscopic image ImgEi captured at each predetermined position. By calculating a plurality of three-dimensional positions for a certain pixel of the endoscopic image, positions in a certain spatial range can be associated with the pixel, thereby reflecting the pixel value of the pixel forming the endoscopic image in the plurality of three-dimensional positions. It should be noted that, since the endoscopic volume data $V_E$ where the pixel value of a certain pixel is reflected in a plurality of positions is generated in this modification, it is preferred that the plurality of three-dimensional positions associated with the certain pixel are in the vicinity of each other.

For example, endoscopic images have a nature that, in the interior of the anatomical structure, an area near to the imaging unit, such as a CCD camera, of the endoscope appears larger, and an area far from the imaging unit appears smaller. Therefore, for areas of the anatomical structure having the same size, the number of pixels representing the area far from the imaging unit is smaller than the number of pixels representing the area near to the imaging unit. In the generated volume data, therefore, a position corresponding to the area far from the imaging unit Pc in the endoscopic images has a smaller number of positions on the endoscopic images associated therewith than those associated with a position corresponding to the area near to the imaging unit Pc in the endoscopic images. In that case, there may be only sparse positions $P_j$ in the three-dimensional coordinate system of the endoscopic volume data $V_E$ that are associated with the positions of the endoscopic images.

Therefore, as shown in FIG. 4, for example, the position calculating means 104 may associate a position corresponding to a position $P_{pr}$ on the endoscopic image not only with a three-dimensional position $P_r$ calculated based on Equation (2) but also with positions $P_{r+1}, P_{r+2}, \ldots, P_{r+rm-1}$ (where rm is the number of pixels present in the spherical area Rd) present in a spherical area Rd of a predetermined radius about the position $P_r$, and the endoscopic volume data generating means 105 may insert the pixel value of the pixel at the position $P_{pr}$ on the endoscopic image into the positions $P_{r+1}, P_{r+2}, \ldots, P_{r+rm-1}$ present in the spherical area of the predetermined radius about the position $P_r$ associated with the position $P_{pr}$ on the endoscopic image. By calculating and associating a plurality of three-dimensional positions in a certain spatial range for and with each pixel corresponding to an area Rd that is far from the imaging unit of the endoscope Pc, appropriate interpolation of pixel values in the area that is far from the imaging unit of the endoscope Pc and therefore has sparse corresponding pixels on the endoscopic images can be achieved. This minimizes such a situation that pixels of the endoscopic volume data $V_E$, in which pixel values of pixels on the endoscopic images are inserted, are sparsely present in the three-dimensional coordinate system and allows generation of the endoscopic volume data with each pixel reflecting a pixel value on the endoscopic images.

It should be noted that, this modification may be implemented such that the position calculating means 104 associates a position corresponding to the position $P_{pr}$ on the endoscopic image with the three-dimensional position $P_r$ calculated based on Equation (2), and the endoscopic volume data generating means 105 inserts the pixel value of the pixel at the position $P_{pr}$ on the endoscopic image into the positions $P_r, P_{r+1}, P_{r+2}, \ldots, P_{r+rm-1}$ present in the spherical area Rd of the predetermined radius about the position $P_r$ associated with the position $P_{pr}$ on the endoscopic image. It should be noted that, in the case where pixel values of corresponding pixels in the plurality of endoscopic images captured from different imaging positions are obtained for each position Pr, $P_{r+1}, P_{r+2}, \ldots, P_{r+rm-1}$ the pixel values obtained from the endoscopic images captured from the different imaging positions corresponding to each position Pr, $P_{r+1}$, $P_{r+2}$, ..., $P_{r+rm-1}$ may be subjected to appropriate processing, such as weighted averaging, to be inserted in each position Pr, $P_{r+1}$, $P_{r+2}$, ..., $P_{r+rm-1}$.

The plurality of three-dimensional positions corresponding to a certain pixel may be positioned in a spherical shape, in a planar or curved shape having a predetermined size, or in a three-dimensional shape, such as a polyhedron (such as cube, cuboid, or the like), a circular cone or a pyramid. Since the endoscopic volume data $V_E$ where the pixel value of a certain pixel is reflected in a plurality of positions is generated, it is preferred that the plurality of three-dimensional positions are positioned to form a shape having a finite size.

The reconstructed endoscopic image $ImgR_E$ generated by the reconstructed endoscopic image generating means 108 may be any of a stretched development image and a stretched cross-sectional image of the anatomical structure 5, or any image of the anatomical structure 5 as long as it can be displayed or reconstructed from the endoscopic volume data $V_E$. The reconstructed endoscopic image $ImgR_E$ obtained from the endoscopic volume data $V_E$ through any of various display methods and reconstruction methods allows image observation which cannot be provided with a conventional endoscopic image, thereby providing a support for more accurate imaging diagnosis. For example, by generating the reconstructed endoscopic image $ImgR_E$ by volume rendering, observation of the three-dimensional shape of the anatomical structure and information, such as color and texture of the anatomical structure, which are conventionally observed with referencing both an endoscopic image and a volume rendered image generated from volume data V generated with a CT apparatus, or the like, can be achieved by viewing the anatomical structure in the single reconstructed endoscopic image $ImgR_E$ from various points of view, and this facilitates understanding of the three-dimensional shape and the information, such as color and texture, of the anatomical structure in an efficient manner.

The endoscopic images obtained by the endoscopic image obtaining means 101 in this embodiment may be spectral images.

The spectral images may be images provided by a technique (Narrow Band Imaging-NB1) where a living mucosa of a digestive organ (such as the stomach) is imaged with using an electronic endoscope apparatus using a solid image pickup device to generate a normal image representing an image of the visible light region of the living mucosa by imaging mainly the visible wavelength region and to generate different types of narrow-bandwidth spectral images of the living mucosa by imaging through different types of narrow-band bandpass filters which transmit light only through narrow wavelength bands, and the normal image and the narrow-bandwidth spectral images are combined to generate a diagnostic image (see Japanese Unexamined Patent Publication No. 2006-341078). Alternatively, the spectral images may be images provided by a technique where a normal color image (which is also referred to as "normal image") is captured with an endoscope, which is provided with an RGB mosaic filter formed by different types of wide-band bandpass filters disposed on a solid image pickup device, through a usual imaging operation using a simultaneous plane imaging technique, and images similar to the above-described narrow-bandwidth spectral images that are obtained with using the narrow-band bandpass filters are obtained through arithmetic processing based on the normal image obtained by imaging a living mucosa, to generate a diagnostic image similar to the above-described diagnostic image (see Japanese Unexamined Patent Publication Nos. 2003-093336 and 2010-075368).

An application example, where the NB1 technique to acquire the normal images and the narrow-bandwidth spectral images as the endoscopic images is applied to this embodiment, is shown below. With the NB1 technique, the normal images and the narrow-bandwidth spectral images are captured at very short time intervals at approximately the same imaging positions and orientations, to provide the normal images and the corresponding narrow-bandwidth spectral images captured at the same positions of the anatomical structure being associated with each other. That is, normal images ImgE and narrow-bandwidth spectral images ImgD corresponding to the normal image ImgE are aligned with each other relative to the same coordinate system.

Therefore, the positions $P_j$ ($x_j'$, $y_j'$, $z_j'$) in the three-dimensional coordinate system corresponding to the pixels $P_{pj}$ ($x_j$, $y_j$, 0) forming each normal image ImgE can be calculated according to the method described in the first embodiment with using the normal images ImgEi and the virtual endoscopic images ImgVi, and the positions ($x_j'$, $y_j'$, $z_j'$) in the same three-dimensional coordinate system can be associated with positions ($x_j$, $y_j$, 0) on the narrow-bandwidth spectral image ImgDi corresponding to the normal image ImgEi. Alternatively, the positions ($x_j'$, $y_j'$, $z_j'$) in the three-dimensional coordinate system $P_j$ corresponding to the pixels $P_{pj}$ ($x_j$, $y_j$, 0) forming each narrow-bandwidth spectral image ImgDi may be calculated according to the method described in the first embodiment with using the narrow-bandwidth spectral images ImgDi and the virtual endoscopic images ImgVi, and the positions ($x_j$, $y_j$, $z_j'$) in the same three-dimensional coordinate system $P_j$ may be associated with the positions ($x_j$, $y_j$, 0) on the normal image ImgEi corresponding to the narrow-bandwidth spectral image ImgDi.

Then, the endoscopic volume data generating means 106 inserts pixel values of the pixels of each normal image ImgEi into the positions $P_j$ in the three-dimensional coordinate system according to the method described in the first embodiment to generate the endoscopic volume data $V_E$ from the normal images ImgEi. Further, the endoscopic volume data generating means 106 inserts pixel values of the pixels of each narrow-bandwidth spectral image ImgDi into the three-dimensional coordinate system $P_j$ according to the method described in the first embodiment to generate endoscopic volume data $V_{ED}$ from the narrow-bandwidth spectral images ImgDi. Since each normal image ImgEi and the corresponding narrow-bandwidth spectral images ImgDi are aligned with each other relative to the same coordinate system, as described above, reduction of the computational load and speeding up of the computation can be achieved by carrying out the position calculation for each pixel on one of the normal image ImgEi and the narrow-bandwidth spectral images ImgDi, and applying the result of the calculation to the corresponding pixel on the other of the normal image ImgEi and the narrow-bandwidth spectral images ImgDi.

Further, by generating the reconstructed endoscopic image $ImgR_E$ from the narrow-bandwidth spectral images ImgDi, various types of analyses and displays can be achieved with the reconstructed endoscopic image $ImgR_E$ provided by volume rendering, or the like, which allows understanding of the information, such as color and texture, and the shape of the surface of the anatomical structure at the same time, thereby contributing to more accurate diagnosis.

Further, also in the case where the technique to generate images equivalent to the narrow-bandwidth spectral images, which are acquired with using narrow-band bandpass filters, by applying arithmetic processing to each normal image ImgEi is used, the same effect is provided by carrying out the position calculation for each pixel of one of the normal image ImgEi and the narrow-bandwidth spectral images ImgDi provided by the arithmetic processing and applying the result of the calculation to each pixel of the other of the normal image ImgEi and the narrow-bandwidth spectral images ImgDi.

Next, a second embodiment of the invention is described. FIG. 5 is a functional block diagram of the second embodiment. The hardware configuration and the functional block of the endoscopic image processing device 1 in the second embodiment of the invention are the same as those in the first embodiment, except that an unassociated area extracting means 110 and a medical image generating means 109 are further provided.

The unassociated area extracting means 110 extracts an unassociated area Ru, which is formed by three-dimensional positions that are associated with none of the pixels forming the endoscopic images captured at the predetermined positions, from the endoscopic volume data $V_E$.

An area in the endoscopic volume data $V_E$ formed by three-dimensional positions that are associated with none of the pixels of the endoscopic image is referred to as the "unassociated area". For example, according to the first embodiment, the endoscopic volume data $V_E$, where the pixel values of certain pixels are reflected in the three-dimensional positions, is generated by calculating the three-dimensional positions corresponding to the pixels forming the endoscopic images. Therefore, it is impossible to associate an unimaged area in the anatomical structure, such as an area which is not captured in the endoscopic images due to a bumpy shape, such as a polyp, or a curved shape in the anatomical structure, with the three-dimensional positions of the endoscopic volume data $V_E$. Further, there are cases where some pixels on the endoscopic images are not associated with the three-dimensional positions, such as the case where the endoscopic image processing of the invention is applied to only a part of each endoscopic image. In such cases, there may be the unassociated area Ru formed by the three-dimensional positions which correspond to none of the pixels forming the endoscopic images.

In this second embodiment, the unassociated area extracting means 110 detects, from pixels forming the anatomical structure, pixels having pixel values that are not changed from the initial values, and extracts an area formed by the extracted pixels as the unassociated area Ru.

Further, the medical image generating means 109 generates a medical image $ImgR_v$ from the volume data V obtained from the storage 2. In the second embodiment, a volume rendered image is generated by volume rendering as the medical image $ImgR_v$. The medical image $ImgR_v$ may be any image that can be generated from the volume data V, and typical examples thereof include images generated by volume rendering and surface rendering.

Figure 6:
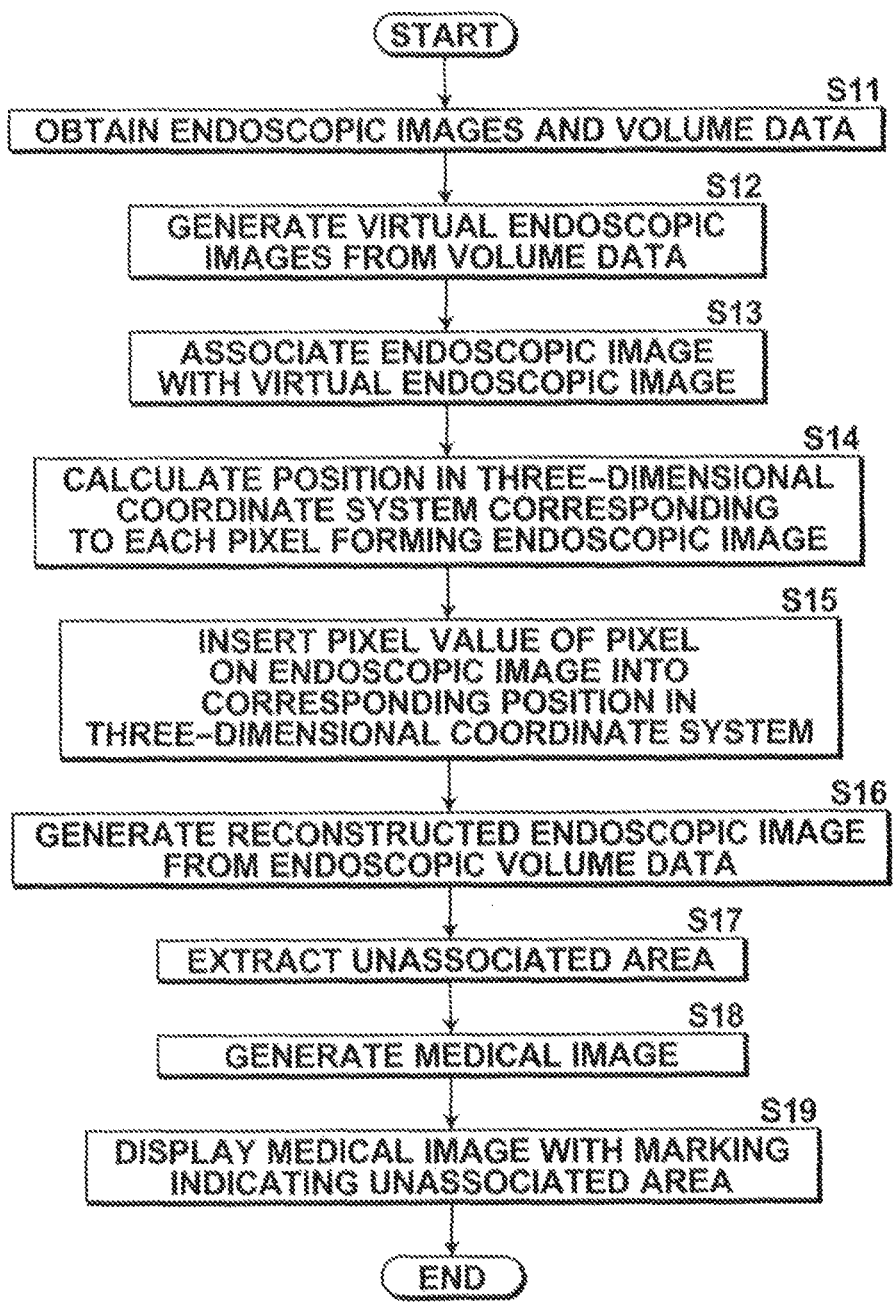
FIG. 6 is a flow chart showing the flow of endoscopic image processing of the second embodiment.
Figure 7:
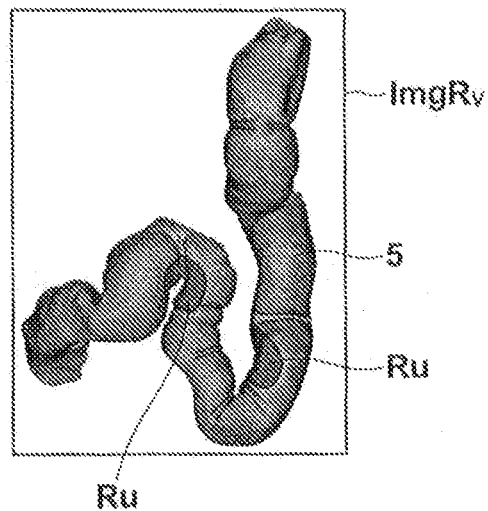
FIG. 7 is a diagram illustrating an example of a medical image with a marking indicating an unassociated area displayed in the second embodiment.

FIG. 6 is a flow chart illustrating the flow of processing according to the second embodiment. FIG. 7 shows an example of markings M indicating the unassociated areas Ru displayed in an identifiable manner on the medical image $ImgR_v$ by the processing of the second embodiment. Now, the processing of the second embodiment is described with using FIGS. 6 and 7. Among the operations shown in FIG. 6, the operations of S11 to S16 are the same as the above-described operations of S01 to S06 shown in FIG. 2, and therefore descriptions thereof are omitted. As shown as the hatched areas in FIG. 3, for example, blind areas of the imaging unit of the endoscope due to the curved shape of the large intestine are the unassociated areas Ru. Since the unassociated areas Ru are not captured in the endoscopic images $ImgE_i$, none of the pixels $P_j$ forming the endoscopic images $ImgE_i$ are associated with the positions in the three-dimensional coordinate system forming the unassociated areas Ru.

The unassociated area extracting means 110 extracts, from the endoscopic volume data $V_E$, the unassociated areas Ru formed by three-dimensional positions which do not correspond to any of the pixels forming the endoscopic images captured at the predetermined positions (S17). Similarly to the first embodiment, the volume data V and the endoscopic volume data $V_E$ are aligned with each other via the same coordinate system. Therefore, the unassociated area extracting means 110 specifies the pixels forming the anatomical structure in the endoscopic volume data $V_E$ with assuming that the positions of the pixels forming the anatomical structure extracted from the volume data V correspond to positions of the pixels forming the anatomical structure in the coordinate system of the endoscopic volume data $V_E$.

Then, the unassociated area extracting means 110 detects, from the pixels forming the anatomical structure in the endoscopic volume data $V_E$, pixels having pixel values that are not changed from the initial values and extracts the pixels as the pixels forming the unassociated areas Ru.

The medical image generating means 109 generates, as the medical image $ImgR_v$, a volume rendered image from the volume data V obtained from the storage 2 (S18).

The display control means 108 obtains the unassociated areas Ru in the three-dimensional coordinate system from the unassociated area extracting means 110, and displays, on the display 3, the markings M indicating the unassociated areas Ru in an identifiable manner on the medical image $ImgR_v$ generated from the volume data V, and the processing of the second embodiment ends (S19). In this embodiment, the display control means 108 sets a predetermined color and a transparency of pixels forming the unassociated areas Ru, and displays the markings M indicating the unassociated areas Ru on the volume rendered image in an identifiable manner by changing the color of the markings M from the colors of other areas of the anatomical structure, as shown in FIG. 7.

As the markings indicating the unassociated areas, any known markings having various shapes, such as a circle, a rectangle or a closed surface, may be used. Further, any of various known display methods may be applied to the markings, such as coloring the markings or making the markings blink. It should be noted that the display control means 108 may combine the medical image $ImgR_v$ with the markings M indicating the unassociated areas Ru and display the combined image on the display 3, or the medical image generating means 109 may generate the medical image $ImgR_v$ containing the markings M indicating the unassociated areas Ru and the display control means 108 may display the medical image $ImgR_v$ containing the markings M indicating the unassociated areas Ru on the display 3.

As a modification of the second embodiment, the display control means 108 may display the markings M indicating the unassociated areas Ru not only on the medical image but also on the reconstructed endoscopic image $ImgR_E$ generated from the endoscopic volume data $V_E$. It should be noted that it is not always necessary to display the shapes corresponding to the unassociated areas Ru of the anatomical structure in an identifiable manner. For example, the unassociated areas Ru may be displayed transparent. Further, the shape of the area where the pixel values of the endoscopic volume data $V_E$ have been changed may be matched with a shape model, or the like, of the anatomical structure, and the shapes of the unassociated areas Ru may be compensated based on the shape model and appropriate pixel values may be inserted into the pixels forming the unassociated areas Ru.

According to the second embodiment, it is facilitated to recognize areas in the endoscopic volume data $V_E$, for which no pixel values are obtained from the endoscopic images ImgEi. Further, in the case where the markings indicating the unassociated areas Ru are displayed on the medical image ImgR$_v$, the contour of the extracted anatomical structure, such as the large intestine, can be shown even when there are areas which are not captured with the endoscope. Thus, the shapes of the areas, for which no pixel values are obtained from the endoscopic images, can be recognized at the same time.

The above-described embodiments are provided by way of example only, and should not be used to construe that the entire description hereinabove limits the technical scope of the invention.

Besides the above-described embodiments, the technical scope of the present invention encompasses various modifications made to the system configuration, hardware configuration, flow of processing, module configuration, user interface, specific contents of operations, etc., in the above-described embodiments without departing from the spirit and scope of the invention.

To the associating means 104, any of various known methods that can extract an endoscopic image captured at a predetermined position of the anatomical structure and a comparative virtual endoscopic image, which is virtually generated as if it is captured at a position corresponding to the predetermined position, may be applied. For example, an endoscopic image that is captured with the distal end of the endoscope being positioned at a predetermined position may be obtained, and the position in the anatomical structure of the distal end of the endoscope positioned at the predetermined position may be detected according to the method disclosed in Patent Document 1 or 2, to obtain a view point of a virtual endoscope corresponding to the position of the distal end, and the comparative virtual endoscopic image may be extracted based on the view point of the virtual endoscope corresponding to the position of the distal end. Alternatively, the user may cause an endoscopic image representing a specific area having an distinguishable feature, such as a branched portion, of the anatomical structure and a virtual endoscopic image representing the same area to be displayed via operation of an input device, such as a mouse, and an input signal indicating that these images show the corresponding predetermined position may be received via operation of the input device by the user to associate the endoscopic image and the virtual endoscopic image which are displayed when the input signal is received with each other.

When the alignment of the images is carried out, instead of using the endoscopic images captured in advance, an endoscope may be connected to the endoscopic image processing device 1, and an endoscopic image forming unit for generating endoscopic images by processing imaging signals fed from the endoscope connected to the endoscopic image processing device 1 may be provided to repeatedly form image signals at a predetermined frame rate by imaging the anatomical structure of the subject with the endoscope in real time, and the thus formed endoscopic images may be used.

The modality may be any modality, such as an MRI apparatus, that can provide volume data, from which the virtual endoscopic images can be generated, besides the above-described CT apparatus.

To the virtual endoscopic image generating means 103, any of known methods for extracting an anatomical structure and for setting a path of the view point of the virtual endoscope may be applied, as long as it can extract the anatomical structure, to which the endoscopic image processing method of the invention is applied, and can set a path of the view point of the virtual endoscope. As one example, in the case where the anatomical structure is a blood vessel, a blood vessel area may be extracted and the center line of the blood vessel may be set according to the method disclosed in Japanese Unexamined Patent Publication No. 2004-313736 or 2006-167287. Alternatively, the center line of the anatomical structure, which serves as the path of the view point of the virtual endoscope, may be set by the user by manually inputting a plurality of points in the anatomical structure on an image displayed by volume rendering, or the like, with using an input device, such as a mouse, and the inputted points may be spline-interpolated to obtain the center line of the anatomical structure.

The endoscopic image processing device 1 may be implemented with a plurality of computers, where the functions as the endoscopic image obtaining means, the virtual endoscopic image generating means, the associating means, the position calculating means, the endoscopic volume data generating means, the reconstructed endoscopic image generating means, the display control means, the medical image generating means and the unassociated area extracting means are divided among these computers. As the devices forming the system, such as the input device, the display, etc., any known devices may be used. For example, a joystick may be used in place of the mouse, and a touch panel may be used in place of the display.

What is claimed is:

1. An endoscopic image processing device comprising:
a memory storing a plurality of components; and
a processor configured to execute the plurality of components, which comprise:
an endoscopic image interface configured to obtain a plurality of endoscopic images captured with an endoscope inserted into an anatomical structure of a subject;
a volume data interface configured to obtain volume data of the anatomical structure acquired through tomographic imaging wherein the obtained volume data is three dimensional image data;
a virtual endoscopic image generator configured to generate a plurality of virtual endoscopic images of the anatomical structure from the obtained volume data;
an associator configured to extract an endoscopic image captured at a predetermined position of the anatomical structure from the obtained endoscopic images, further configured to extract a comparative virtual endoscopic image virtually generated as if being captured at a position corresponding to the predetermined position from the obtained virtual endoscopic images, and further configured to associate the extracted endoscopic image and the comparative virtual endoscopic image with each other;
a position calculator configured to calculate a three-dimensional position of each pixel forming the anatomical structure based on the obtained volume data, specifying each pixel forming the associated comparative virtual endoscopic image corresponding to each pixel forming the endoscopic image captured at the predetermined position, specifying each pixel on an inner wall of the anatomical structure in the obtained volume data corresponding to each pixel forming the comparative virtual endoscopic image, and further configured to calculate, as a three-dimensional position corresponding to each pixel forming the endoscopic image, the three-dimensional position of the pixel on the inner wall corresponding to each pixel forming the associated comparative virtual endoscopic image corresponding to each pixel forming the endoscopic image; and an endoscopic volume data generator configured to generate volume data, which includes the pixels forming the anatomical structure and the pixels positioned in the calculated three-dimensional positions corresponding to each pixel forming the endoscopic image and further configured to generate an endoscopic volume data by inserting a pixel value of each pixel forming the endoscopic image as the pixel value of each pixel positioned in the calculated three-dimensional positions corresponding to each pixels forming the endoscopic image based on the generated volume data and the endoscopic image, wherein the endoscopic volume data is three dimensional image data, and wherein the endoscopic volume data generator is configured to insert a pixel value of a certain pixel among the pixels forming the endoscopic image as pixel values of a plurality of pixels included in a predetermined regions which includes the three-dimensional positions of the endoscopic volume data corresponding to the certain pixel.

2. The endoscopic image processing device as claimed in claim 1, wherein the components executed by the processor further comprise:

a reconstructed endoscopic image generator configured to generate a reconstructed endoscopic image reconstructed from the endoscopic volume data generated from the endoscopic image; and a display controller configured to cause the generated reconstructed endoscopic image to be displayed on a display.

3. The endoscopic image processing device as claimed in claim 1, wherein the endoscopic volume data generator configured to insert the pixel value of the certain pixel as pixel values of a plurality of pixels included in the predetermined region which has a spherical shape region having a predetermined radius.

4. The endoscopic image processing device as claimed in claim 1, wherein the endoscopic images obtained by the endoscopic image obtaining interface are spectral images.

5. The endoscopic image processing device as claimed in claim 2, wherein the generated reconstructed endoscopic image is a stretched development image or a stretched cross-sectional image of the anatomical structure.

6. The endoscopic image processing device as claimed in claim 2, further comprising unassociated area extracting means for extracting, from the endoscopic volume data, an unassociated area formed by three-dimensional positions that are associated with none of the pixels forming the endoscopic image captured at the predetermined position.

7. The endoscopic image processing device as claimed in claim 6, further comprising medical image generating means for generating a medical image from the volume data, wherein the display control means causes a marking indicating the unassociated area to be displayed on the medical image generated from the volume data.

8. The endoscopic image processing device as claimed in claim 6, wherein the display control means causes a marking indicating the unassociated area to be displayed on the reconstructed endoscopic image generated from the endoscopic volume data.

* * * * *